Figure 1:
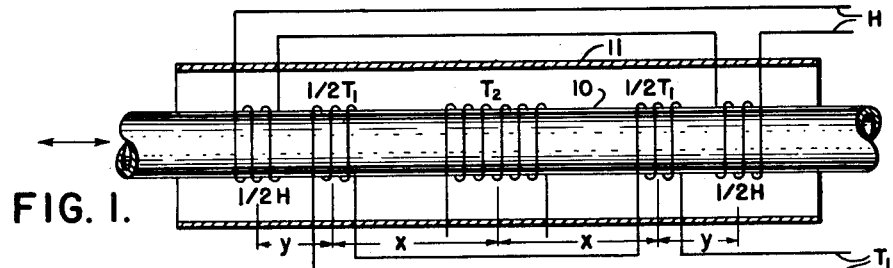

INVENTOR.
Nathan Schnoll
BY Charles H. Brown
ATTORNEY

United States Patent Office 3,020,760
Patented Feb. 13, 1962

3,020,760
FLOW CELL
Nathan Schnoll, West Englewood, N.J., assignor to Flow Measurements Corporation, Kensington, Md., a corporation of Maryland
Filed Oct. 31, 1957, Ser. No. 693,774
9 Claims. (Cl. 73—204)

This invention relates to improvements in flow cells adapted for use in systems for measuring the rate of flow or quantity of flow of a fluid, such as, for example, gasoline, slurries, water, and gases.

In my copending application, Serial No. 674,854, filed July 29, 1957, there is described a flow cell and electronic flow meter system therefor. The flow cell of my copending application comprises an electric heating coil wound around the outside of the conduit through which the fluid to be measured flows, and two resistance temperature detectors (thermometers, effectively, which feed into a Wheatstone bridge) also wrapped around the outside of the pipe—one upstream from the heater coil and the other downstream. The heating coil and resistance temperature detectors are mounted in intimate thermal contact with the outer surface of the pipe which they surround. The temperature differential or gradient between the upstream and downstream thermometers due to the fluid flowing within the pipe is a function of both the fluid mass flow rate and the wattage dissipated in the heater coil. Any flow of liquid through the pipe will cause a temperature gradient in the pipe. The faster the flow rate the lower will be the temperature differential along the pipe, and vice versa. The amount of power (watts dissipated in the heater coil) supplied to the fluid to maintain a constant temperature differential between the two temperature detectors is a measure of the mass-flow rate. The flow cell lends itself to remote indication, recording and control, since it produces an electrical signal which varies over a wide range of flow rates. The rate of flow can be integrated so that continuous or pulsating flows can be measured in total.

Generally, these flow cells are inserted in the piping system through which the fluid flows and are arranged vertically. The overall length of the flow cell may vary from 1 to 2 feet, by way of example. I have found that the temperature gradient in the atmosphere in a normal room from floor to ceiling may easily be as great as 2 to 3 degrees F. and more. A pipe in the room extending vertically will also assume a temperature gradient depending upon its location and length. Along a length of pipe about 1 ft. long, the temperature difference at both ends, due to the atmospheric temperature gradient, may amount to ½° F. This temperature gradient may vary with the time of the day and room temperatures.

Temperature gradients may be introduced in the cell also, whether installed in a horizontal or vertical position, in numerous other ways such as by the addition or removal of heat to the fluid at some region of the flow system, or by differences in temperature between the main body of fluid and the piping in the region of the flow cell. At sufficiently high flow rates temperature gradients may arise due to friction between the fluid and the cell walls and piping.

Temperature differentials of the character just described, when introduced along the axis of flow of a flow cell of the kind described in my copending application, supra, employing a length of conduit with two sets of temperature thermometers and a heater, are undesirable, because they enter into and modify the temperature gradient introduced by the heater, and thus interfere with the calibration of the instrument coupled to the flow cell. It will be appreciated that because the undesired temperature gradients are in general not uniform and constant, it has not been possible heretofore to compensate for this undesired differential in temperature. Elimination of the undesired temperature differentials results in an improvement in the accuracy of the flowmeter; it also makes possible a reduction of the power required in the heater coil since satisfactory operation can now be obtained with smaller heater derived temperature differentials. The overall gain of the system due to decrease of heater power can be compensated for by additional amplification of the bridge output voltage. This makes possible use of the caloric flowmeter for flow rate measurements on fluids with lower boiling points or temperature sensitive characteristics, which it might otherwise not be practicable to handle.

Elimination of the undesired temperature differentials furthermore improves the response time and the smoothness of operation of the flowmeter for the following reason. Large sections of the piping, the outer elements of the cell structure, and large quantities of the fluid, enter into the determination of the undesired temperature gradients within the cell, hence long times are in general required for these gradients to assume equilibrium. On the other hand the heater induced temperature gradients involve elements of small mass and generally only the boundary layer of a short length of the fluid and a short length of thin-walled conduit.

An object of the present invention is to eliminate the effect of temperature gradients along a flow cell due to atmospheric or other causes other than that due to the heater within the flow cell.

A further object of my invention is to reduce the power required in the heater of the flow cell for satisfactory operation.

A still further object of my invention is to improve the response time and reduce the transients in response due to fluid and atmospheric temperature variations.

Another object is to provide a flow cell having a heater coil and a plurality of physically separated temperature sensitive detectors so arranged in intimate thermal contact with a conduit through which fluid flows, that the temperature gradient or differential between the temperature detectors is a function of both the fluid mass flow rate and the wattage dissipated in the heater coil, but is independent of the fluid and surrounding temperatures.

Still another object is to eliminate the effect of temperature gradients due to atmospheric and fluid flow causes along a conduit or pipe carrying the fluid therein, while retaining the effect of the temperature gradient caused by a heater in thermal contact with the pipe for measuring the rate of flow of the fluid.

In brief, the objects of the invention are achieved by neutralizing or cancelling the effects of undesired temperature differentials along the length or longitudinal axis of the conduit of a flow cell without interfering with temperature gradient introduced by the heater. This is accomplished by separating one or both of the two temperature sensing detectors into two or more similar parts or sections and so positioning these parts along the cell that the net difference in temperature between the detectors, each considered as a whole or single entity, due to undesired causes, is substantially zero.

According to one embodiment of the invention, both the heater and one temperature sensing detector of the flow cell are each divided into two similar parts or halves positioned on opposite sides of the other temperature sensing detector. The heater parts are arranged closer to the correspondingly positioned parts of the divided temperature sensing detector than to the other temperature sensing detector.

According to another embodiment of the invention, only one temperature sensing detector of the flow cell is divided into two similar parts or halves electrically connected in series relationship and symmetrically positioned on opposite sides of the other temperature sensing detector. The heater, in the form of a single coil, is positioned close to and on the far side of one of these parts relative to the other or undivided temperature sensing detector.

In still a third embodiment of the invention, the heater is centrally positioned relative to both temperature sensing detectors along the longitudinal axis of the cell. In this embodiment both temperature sensing detectors may each be divided into two similar parts or halves symmetrically positioned on opposite sides of the heater. The two halves of each detector are electrically connected in series relation. The centrally positioned heater is positioned closer to the two parts or halves of one detector than to those of the other detector. If desired, the turns of the heater coil may be interleaved with the turns of, or superimposed upon, the detector coil nearest to it, which in turn, need not be subdivided.

Figure 3:
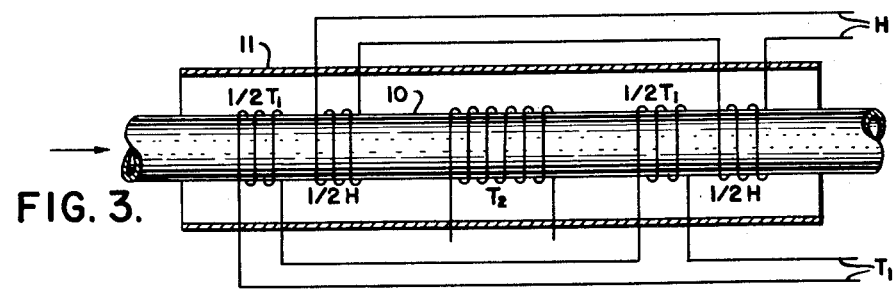
Figure 4:
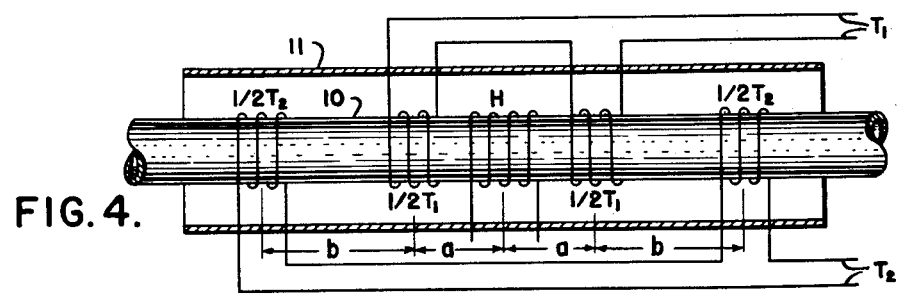
Figure 6:
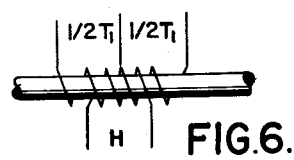
Figure 5:
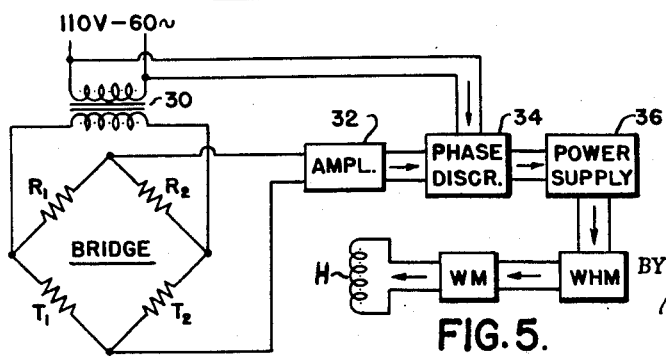

A more detailed description of the invention follows, in conjunction with a drawing wherein:

FIGS. 1 to 4 illustrate flow cells according to four different embodiments of the invention, FIG. 5 illustrates, schematically, the circuit diagram of a flow rate measuring system in which the flow cell of the invention may be used, and FIG. 6 illustrates schematically another modification.

Throughout the different figures of the drawing the same parts are identified by the same reference characters or numerals.

Referring to FIGS. 1 to 4 showing different embodiments of the invention, there are shown the essential elements of a flow cell hitherto proposed, of a type described in my copending application Serial No. 674,854 to which reference is made, except for the construction and positioning of the thermal elements or coils. The flow cell includes a cylindrical thin-walled pipe or conduit 10 having a very smooth interior through which the fluid to be measured flows. This conduit may be made out of metal, glass, plastic or other material which will readily transfer heat from the fluid to the various thermal elements of the flow cell, and vice versa, or made out of a combination of these materials. This cell may have any desired overall length, for example 1 to 2 feet. A pair of resistance temperature responsive detector coils (thermometers) $T_1$ and $T_2$ and a heater coil H are wound around the conduit or pipe 10, in intimate thermal contact therewith. The heater coil is always positioned closer to one of the temperature responsive coils than to the other. The coils $T_1$ and $T_2$ may each be made up to 100 ohm nickel wire. The heater coil may be made up of Nichrome or constantan. The arrows indicate the direction of fluid flow through the cell.

The outer thicker cylindrical metal pipe 11 surrounds the coils for protecting the coils from fumes and water in the atmosphere. It is preferred that the inner thin-walled conduit 10 and the outer thicker-walled pipe 11 be made of the same material or compatible materials having the same temperature coefficient of expansion. The flanges or collars on the ends of the cell and the electrical terminals or socket for the connections to the different coils have not been shown in order not to detract from the clarity of the drawings, but they may generally follow the arrangements disclosed in my copending application, supra.

In the flow cell of FIG. 1, the temperature responsive detector coil $T_1$ is divided into two equal parts or halves $1/2T_1$ and $1/2T_1$ positioned symmetrically on opposite sides of the temperature responsive coil $T_2$. The two halves $1/2T_1$ are identical in regard to material and number of turns. Thus, each half $1/2T_1$ may be 50 ohms in resistance and $T_2$ may be 100 ohms in resistance at a particular temperature. The heater H is also divided into two equal parts or halves $1/2H$ and $1/2H$ positioned symmetrically on opposite sides of both temperature responsive detector coils, as shown. Because of the construction and arrangement of the coils, undesired temperature differentials along conduit or pipe 10 are neutralized or cancelled while the temperature gradient introduced by the two halves of the heater coil are additive electrically. The reason for this effect will now be given. Considering temperature detector coil $T_2$ as a reference value, one of the $1/2T_1$ coils on one side of $T_2$ will have a temperature opposite that of the other $1/2T_1$ coil which is positioned the same distance on the other side of $T_2$, insofar as undesired temperature gradients along the pipe 10 are concerned, such as may be due to atmospheric causes. Because the net difference in temperature between detector coil $T_2$ and detector coil $T_1$ as a whole is substantially zero, the undesired temperature gradient is eliminated in regard to its effect on the flow cell. As for the heater effects, the left half $1/2H$ coil heats the nearest $1/2T_1$ half to a temperature which is higher than the temperature of $T_2$. Similarly, the right half $1/2H$ coil heats its nearest $1/2T_1$ half to a temperature higher than that of $T_2$. There is, however, a temperature gradient between both halves $1/2T_1$ and coil $T_2$ in the same direction (additively) due to the rate of flow of the fluid in conduit 10. Stated in other words, the left $1/2T_1$ increases in resistance with heat from the left $1/2H$, and similarly the right $1/2T_1$ increases in resistance with heat from the right $1/2H$. Since both halves $1/2T_1$ are electrically in series relation, the effect is additive.

An advantage in the arrangement of FIG. 1, is that the symmetrical positioning of the halves of detector coil $T_1$ and heater coil H lends itself to measurement of fluid flow in either direction without affecting the calibration of the instrument coupled to the flow cell of the invention. In the absence of such symmetry, the calibration is correct for only one direction of flow and may be totally ineffective for a reversal in direction of flow.

Figure 2:
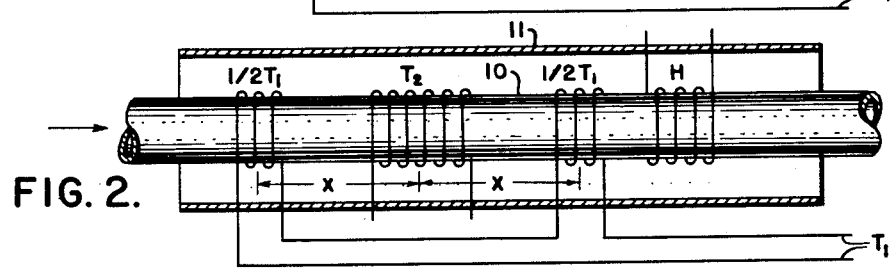

FIG. 2 is a modification of FIG. 1 and differs therefrom in the arrangement of a heater coil H. In FIG. 2, the heater coil is not divided as in FIG. 1 but is positioned on only one side of one of the halves $1/2T_1$. The flow cell of FIG. 2 is more sensitive than the cell of FIG. 1, and also reduces the effects of undesired temperature gradients along the length of conduit 10.

FIG. 3 discloses another embodiment of a flow cell in accordance with the invention. The flow cell of FIG. 3 is somewhat like that of FIG. 1 in the use of a temperature detector coil $T_1$ and a heater coil H both of which are divided into two halves. The identical halves $1/2T_1$ are symmetrically positioned on opposite sides of detector coil $T_2$. It should be noted, however, that in FIG. 3 the identical halves $1/2H$, although positioned on opposite sides of detector coil $T_2$, are not symmetrically positioned relative to this detector. Both heater halves $1/2H$ are positioned downstream relative to their respective nearest $1/2T_1$ sensing or detector coils. The flow cell of FIG. 3 is more sensitive than that of FIG. 2.

FIG. 4 discloses still another embodiment of a flow cell in accordance with the invention. In this embodiment, both detector coils $T_1$ and $T_2$ are divided into identical halves and the halves of each coil are symmetrically positioned on opposite sides of the heater coil H. The halves $1/2T_1$ are closer to heater H than are the halves $1/2T_2$. The cell of FIG. 4 reduces the effects of undesired temperature gradients in the same way as the cells of FIGS. 1, 2 and 3. The flow cell of FIG. 4 has the advantage over the cells of FIGS. 1 to 3 in being able to produce a maximum temperature differential between detector coils $T_1$ and $T_2$ at zero flow of the fluid within the conduit 10. The division of detector coil $T_1$ on opposite sides of the centrally positioned heater H aids in maintaining this maximum temperature differential. In the cells of FIGS. 1, 2 and 3, however, there is a tendency for the temperature differential between detector coils $T_1$ and $T_2$ to be reduced when there is a zero fluid flow condition. Thus, although all modifications work well during dynamic conditions (i.e. with fluid flowing through the flow cell), the cell of FIG. 4 will indicate a condition of zero flow (no fluid flowing). Since the reduction or disappearance of a temperature differential between coils $T_1$ and $T_2$ is the normal result of a fast flow rate, there is some danger of a false indication when using the cells of FIGS. 1, 2 and 3 to furnish a zero flow rate indication.

Because an important feature of the cell of FIG. 4 is the central location of the heater H relative to both detector coils $T_1$ and $T_2$, the turns of the heater coil can be interleaved with turns of coil $T_1$ and be positioned on top or underneath of coil $T_1$ as shown in FIG. 6. Hence the heater coil H can have an overall length which is smaller or greater than that of coil $T_1$ but appreciably less than the center-to-center spacing of both halves $1/2T_2$ of detector coil $T_2$.

FIG. 5 illustrates, in box form, an electrical measuring circuit in which the flow cell of the invention may be used. The temperature responsive sensitive detector or sensing coils $T_1$ and $T_2$ of FIGS. 1 to 4 are represented by resistor arms of the same designations in the Wheatstone bridge of FIG. 2. An alternating current source feeds one diagonal of the bridge via transformer 30. Output is taken from the other diagonal of the bridge which feeds amplifier 32. A change in the rate of flow through the flow cell provides an unbalance in the bridge which is amplified in amplifier 32 and detected in phase discriminator 34. The output from the phase discriminator controls the power from power supply 36 which feeds the heater coil H. A watthourmeter WHM and a wattmeter read power integrated with time and the power only, respectively, to the heater. These may then be calibrated in terms of total flow and the flow rate. The direction of change of output from the power supply 36 is such as to restore bridge null balance. Operation is accomplished without mechanical devices or opening or closing of contacts.

What is claimed is:

1. A flow cell having a conduit through which the fluid to be measured is adapted to flow and along the axis of flow of which appear undesired normal temperature gradients, a pair of temperature sensing resistance detectors, one of said sensing detectors being divided into two spaced detecting resistors connected in electrically series relation but physically positioned along said conduit on opposite sides of an intermediate location on said conduit, said other temperature sensitive detector being positioned at said intermediate location, the locations of said two spaced resistors being selected such that the net normal temperature difference therebetween relative to said intermediate location is substantially zero, and a heater placed closer to one temperature sensing detector than to the other temperature sensing detector, said pair of temperature sensing resistance detectors and said heater being in thermal contact with the fluid adapted to flow within said conduit.

2. A flow cell in accordance with claim 1, wherein the two parts of said one sensing detector have equal resistances, and the sum of said resistances is equal to the resistance of said other temperature sensing detector.

3. A flow cell in accordance with claim 1 wherein said conduit is made of metal and said temperature sensing detectors and said heater are coils mounted upon the exterior of said conduit and in intimate thermal contact therewith.

4. A flow cell in accordance with claim 1, wherein said heater is divided into two halves connected in electrically series relation but positioned on opposite sides of the nearest sensing detector.

5. A flow cell in accordance with claim 1, wherein said heater is divided into two halves connected in electrically series relation but positioned on opposite sides of said other sensing detector at regions downstream relative to the nearest half of said one sensing detector.

6. A flow cell in accordance with claim 1, wherein said heater is positioned entirely on one side of said two halves and downstream relative to the direction of flow.

7. A flow cell having a conduit through which the fluid to be measured is adapted to flow and along the axis of flow of which appear undesired temperature gradients, a pair of temperature sensing resistance detectors mounted on said conduit so as to be in thermal contact with the fluid to be measured, one of said sensing detectors being divided into halves which are connected in electrically series relation and placed symmetrically on opposite sides of the other sensing detector, and a heater also mounted on said conduit in thermal contact with the fluid to be measured, said heater being centrally located relative to said pair of sensing detectors, both temperature sensing detectors being divided into two equal parts symmetrically located on opposite sides of the heater.

8. A flow cell having a conduit through which the fluid to be measured is adapted to flow and along the axis of flow of which appear undesired temperature gradients, a pair of temperature sensing resistance elements and a heater mounted on said conduit so as to be in thermal contact with the fluid to be measured, each of said temperature sensing detectors having two physically spaced similar parts connected in electrically series relation and placed symmetrically on opposite sides of the heater, the two parts of one of said sensing detectors being respectively a greater distance from said heater as measured along the length of said conduit than the correspondingly positioned parts of the other sensing detector, whereby said heater is centrally positioned relative to the parts of each temperature sensing detector.

9. A flow cell having a conduit through which the fluid to be measured is adapted to flow and along the axis of flow of which appear undesired temperature gradients, a pair of temperature sensing resistance detectors mounted on said conduit so as to be in thermal contact with the fluid to be measured, one of said sensing detectors being divided into halves which are connected in electrically series relation and placed symmetrically on opposite sides of the other sensing detector, and a heater also mounted on said conduit in thermal contact with the fluid to be measured, said heater being centrally located relative to said pair of sensing detectors, said heater and said sensing detectors being coils of conductive material, the turns of said heater being interleaved with the turns of said other sensing detector.

References Cited in the file of this patent

UNITED STATES PATENTS

| 1,902,427 | Sawyer | Mar. 21, 1933 |
| 2,525,197 | Beams et al. | Oct. 10, 1950 |

FOREIGN PATENTS

| 603,461 | Germany | Oct. 1, 1934 |
| 649,030 | Great Britain | Jan. 15, 1951 |